Patented Oct. 14, 1941

2,259,423

UNITED STATES PATENT OFFICE 2,259,423

PREPARATION OF HYDROGENATION CATALYST

William J. Kirkpatrick, Marshallton, Del., assignor to Hercules Powder Company, Wilmington, Del., a corporation of Delaware No Drawing. Application March 15, 1941, Serial No. 383,541

12 Claims. (Cl. 252—251)

This invention relates to an improved method for the production of hydrogenation catalysts. More particularly, it relates to an improved method for the production of noble metal hydrogenation catalysts.

It is believed that the preparation of catalysts for the hydrogenation of unsaturated compounds by the fusion of a noble metal compound with an alkali metal nitrate was first disclosed by Vorhees and Adams in J. A. C. S. 44, 1397 (1922). Since this discovery, it has been found that improved results could be obtained through the use of various supports for the noble metal oxide. However, there are difficulties presented in the preparation of this type of catalyst which the use of a support does not remove.

It is known that in order to obtain a highly active catalyst the alkali metal salts remaining in the catalyst after fusion must be removed. The salts present consist of the alkali metal nitrate, the alkali metal nitrite, etc. The most convenient solvent for their removal is water, and this in the past has been employed. However, with its use, at some time during the washing operation, the noble metal oxide becomes colloidal and is carried away from the catalyst along with the wash water. This problem is experienced whether the noble metal oxide is in supported or unsupported form, and it is one which is extremely important inasmuch as the materials under consideration are so expensive.

The remedy which has heretofore been applied is to stop washing the catalyst as soon as it commences to become colloidal. This is not a very satisfactory solution, for noble metal oxide catalysts prepared by the fusion of a noble metal compound and an alkali metal nitrate are not uniform in their tendencies to become colloidal during the washing operation. Hence, by the method of washing, heretofore employed, a great amount of control work is required; also the recovery of the colloidal platinum from the wash water is time-consuming. Furthermore, the resulting catalyst does not have maximum activity due to the fact that washing has not been continued to the point where substantially all of the alkali metal salts have been removed. Not only do these catalysts lack maximum activity but their activity is non-uniform. Factors such as these have been responsible for the delay in adapting noble metal catalysts to many commercial processes even though they possess several distinct advantages over the base metal catalysts presently employed.

It is an object of this invention to provide a method for the production of a noble metal oxide hydrogenation catalyst of exceedingly high activity.

It is a further object to provide a method for the production of a noble metal oxide hydrogenation catalyst of uniform activity.

A still further object is to provide a method for the production of a noble metal oxide hydrogenation catalyst which may be employed without the loss of substantial quantities of the noble metal.

Other objects of this invention will become evident hereinafter.

These objects have been accomplished by fusing a noble metal compound with an alkali metal nitrate and washing the resultant noble metal oxide with an aqueous solution of an acid electrolyte, which solution is inert to and incapable of dissolving the noble metal oxide, and which electrolyte is free of elements which are potential producers of noble metal hydrogenation inhibitors. The washing is continued until the catalyst is washed substantially free of alkali metal salts. A catalyst is considered to be substantially free of alkali metal salts for the purposes of this invention when it contains less than about 0.5 part per million of alkali metal as determined by spectrographic analysis. Such a catalyst, which is substantially free of alkali metal salts, shows a definite improvement over those of the prior art. It has a higher and more uniform activity and may be prepared without the loss of substantial quantities of noble metal.

Any noble metal oxide catalyst which is prepared by the fusion of a noble metal compound and an alkali metal nitrate at an elevated temperature may be treated in accordance with the processes of this invention to give the results hereinbefore described. Thus, the unsupported noble metal oxide catalyst prepared according to Vorhees and Adams, J. A. C. S. 44, 1397 (1922) and described with greater particularity by Adams and Shriner in, J. A. C. S. 45, 2171 (1923), etc. may be treated in accordance with the present invention. In addition, any supported catalyst comprising the product of the reaction of a noble metal compound and an alkali metal nitrate may be treated in accordance with this invention to obtain a supported catalyst free of alkali metal salts. For example, the supported catalyst of U. S. Patent 2,207,868, Serial Number 753,133, issued July 16, 1940, to Robert W. Martin, may be so treated.

For an additional example of a supported noble metal oxide catalyst which may be treated in accordance with this invention, see my co-pending application for U. S. patent, Serial Number 370,800, filed December 19, 1940. The following is a description of the processes of said application.

Accordingly, a noble metal oxide is deposited on an inert, granular, substantially non-porous support material, the particles of which have rounded surfaces and an average size by number of less than about 10 microns in diameter. Preferably, the average particle size will be within the range of from about 5.0 to about 0.5 micron in diameter. By "a substantially non-porous" substance it is meant that the non-porosity refers to the particles themselves in contradistinction to the material as a whole. Also, by "substantially non-porous" it is meant that the pores, if there be any, of the particles of the material under consideration are small as compared with the particles themselves.

By particles having rounded surfaces, there is contemplated the inclusion of particles whose surfaces are rounded or conchoidal, not those whose surfaces are made up of plane surfaces, such as, cleavage planes. It is also contemplated that aggregates of particles be substituted for discrete particles or that particles be formed into aggregates as part of the process of making the catalyst.

Furthermore, it should be understood that by average particle size of a certain range, it is contemplated that the material will consist substantially of particles of a size within the range given with a relatively small proportion of particles having a size without the range in contradistinction to a material which, although the average particle size may be within the range, will consist substantially of particles without the range.

In accordance with the aforesaid application, the catalyst is prepared by adding to an aqueous solution of a noble metal compound, contained in a suitable vessel, a quantity of an alkali metal nitrate. Or, if desired, an aqueous solution of an alkali metal nitrate may be prepared and the noble metal compound which is soluble in water or dilute acid added to it. Preferably, the nitrate should be employed in an amount which varies between the stoichiometric equivalent and about a 50% excess thereof. For example, six mols of sodium nitrate react with one mol of platinum chloride. Hence, the nitrate should be employed in an amount between 6 and 9 mols for each mol of platinum chloride. The same applies for rhodium chloride. It is important too that the minimum amount of water possible be employed in effecting the solution.

To this solution the above-described support material is added and the whole taken to dryness with constant stirring. Desirably, the resulting material is ground lightly and mixed thoroughly for the purpose of distributing the noble metal salts evenly throughout the mass. In order to form the noble metal oxide, the mass is then heated in a suitable furnace at a temperature within the range of from about 450° C. to about 550° C. for a period of from about 30 minutes to about 60 minutes. Preferably, however, I heat the material for about 40 minutes at a temperature within the range of from about 500° C. to about 550° C. The mass is then allowed to cool. After removal of water-soluble impurities, the catalyst is ready for use.

The support material having the characteristics hereinbefore described may comprise naturally occurring, finely divided materials such as, true tripoli, or naturally occurring minerals that ordinarily have to be reduced to a finely divided condition by means of grinding, such as, quartz, corundum, zircon, rutile, brookite, anatase, beryl, cristobalite, baddeleyite, thalenite, thorite, bromellite, chrysoebryl, tridymite, opal, etc.

The support materials may also comprise artificial, finely divided substances of the class of refractory oxides and silicates, such as, fused alumina, fused silica, fused beryllia, fused titania, fused zirconia, fused thoria, fused beryllium silicate, fused aluminum silicate, fused zirconium silicate.

The support material of the aforesaid application may be produced from finely divided porous material, such as, diatomaceous earth, by subjecting it to an alkali flux calcining treatment as described in U. S. Patent 1,502,547 to R. Calvert, K. L. Dern, and G. A. Alles so as to render it substantially non-porous.

Returning to the processes of the present invention, any of the aforesaid noble metal oxide hydrogenation catalysts, after their preparation by fusion, will be washed with an aqueous solution of an acid electrolyte, which solution is inert to and incapable of dissolving the noble metal oxide. It is required, in addition, that the electrolyte used be free of elements which are potential producers of noble metal hydrogenation inhibitors.

In general, any inorganic or organic acid which is an electrolyte may be used to accomplish the objects of this invention. For example, inorganic acids, such as, hydrochloric, nitric, sulfuric, hydriodic, hydrobromic, sulfamic, orthophosphoric, pyrophosphoric, metaphosphoric, etc. acids; monobasic organic acids, such as, acetic, monochloroacetic acid, dichloroacetic, trichloroacetic, propionic, butyric, isobutyric, valeric, isovaleric, glycollic, lactic, etc. acids; polybasic organic acids, such as, oxalic, tartaric, malic, malonic, maleic, adipic, citric, citraconic, glutaric, succinic, trihydroxy glutaric, saccharic, etc. acids may be employed in accordance with the invention. As hereinbefore stated, an acid electrolyte which contains an element which is a potential producer of a catalyst poison or inhibitor cannot be employed. The elements which are responsible for the formation of catalyst poisons during hydrogenation processes wherein noble metal catalysts are employed comprise tin, lead, copper, arsenic, antimony, bismuth, selenium, tellurium, sulfur of a valence other than (+6), and phosphorus of a valence other than (+5). Thus, for example, acid electrolytes, such as, arsenious, arsenic, selenic, selenious, phosphorous, sulfurous, etc. acids cannot be employed inasmuch as their presence during the hydrogenation process in which the catalyst is later used is responsible for the formation of poisons which reduce the activity of the catalyst.

The concentration of the acid electrolyte in the wash solution employed will be greater than about 0.5%. Preferably, however, a solution of a concentration between about 1% and about 10% will be employed. The temperature of the solution is not critical, however, it is preferred that it be within the range of from about 0° C. to about 50° C. After the catalyst has been washed to the extent that it is substantially free of alkali metal salt, it is dried, preferably, at a temperature of 100° C. or lower. As heretofore stated, the catalyst is considered substantially free of alkali metal salt when a spectrographic analysis shows it to contain less than 0.5 part per million of alkali metal.

There follow specific examples which illustrate several ways in which the principles of the invention are demonstrated, but they are not to be taken as exclusive or limiting in any way. The parts and percentages, unless otherwise indicated, are by weight.

Example 1

One part of ammonium chloroplatinate was intimately mixed in a porcelain ball mill with 10 parts of sodium nitrate. The mixture was heated to 510° C. over a 30-minute period and held at this temperature for 30 minutes. The reaction mass was cooled to 25° C. over an additional period of 30 minutes and was then stirred into 200 parts of an acetic acid solution, having an acetic acid concentration of 10.0%. The solution was filtered off and the washing was repeated with an acetic acid solution, having an acetic acid concentration of 10.0%, until the filtrate was spectroscopically free of sodium. A spectrographic analysis of the platinum oxide catalyst remaining showed it to contain less than 0.5 part per million of sodium. The acetic acid filtrates were spectrographically free of platinum, showing that there had been no loss of noble metal oxide during the washing. The catalyst was dried at 100° C. and was then ready for use.

Example 2

One part of metallic platinum, from ammonium chloroplatinate by ignition at substantially 500° C., was dissolved in 30 parts of aqua regia (1 part nitric and 3 parts hydrochloric acid) in a glazed porcelain dish at about 100° C. The solution was taken substantially to dryness with several additions of nitric acid. Eight parts of sodium nitrate were added to sufficient water for a solution, and the resulting solution along with 12 parts of ground quartz was added to the treated platinum and the whole was taken to dryness at a temperature of 95° C. with constant stirring. The resulting mass was lightly ground so as to cause thorough mixing without further comminution of the quartz. It was heated in a slow stream of air at 538° C. for 20 minutes and then allowed to cool to 500° C. over a 30-minute period. After an additional cooling period of 30 minutes, the mass which had a temperature of 25° C. was stirred into 500 parts of distilled water and allowed to stand 3 days. The catalyst was then filtered and washed with 500 parts of aqueous acetic acid, having an acetic acid concentration of 5.0%. The catalyst was again filtered and given a final wash with 200 parts of aqueous acetic acid of the same concentration. After filtration, the catalyst was dried at 90° C.–100° C. A spectrographic analysis showed the catalyst to contain less than 0.5 part per million of sodium. The filtrates obtained herein were found to be spectrographically free of platinum. The catalyst was again lightly ground to break up any large particles after which it was ready for use.

Example 3

A platinum oxide catalyst was prepared following the same procedure as that of Example 2 with the exception that the catalyst, after fusion and cooling, was washed with an aqueous 5.0% nitric acid solution until the filtrate was spectroscopically free of sodium. After filtration, the catalyst was dried at 90° C. to 100° C. A spectrographic analysis showed the catalyst to contain less than 0.5 part per million of sodium. The filtrate when examined spectrographically was shown to be free of platinum.

Example 4

A platinum oxide catalyst was prepared following the same procedure as that of Example 2 with the exception that the catalyst, after fusion and cooling, was washed with an aqueous 5.0% hydrochloric acid solution until the filtrate was spectrographically free of sodium. After filtration, the catalyst was dried at 90° C. to 100° C. A spectrographic analysis showed the catalyst to contain less than 0.5 part per million of sodium. It was apparent that the platinum oxide had not become colloidal during the washing inasmuch as the filtrate was spectrographically free of platinum.

Example 5

Five parts of metallic palladium were dissolved in aqua regia in a glazed porcelain vessel, and the solution was taken substantially to dryness at about 100° C. 40 parts of sodium nitrate and sufficient water to effect solution were then added. The solution was cleared by the addition of a small amount of nitric acid. Thereafter the solution was heated until the temperature had reached about 70° C. at which point 22.5 parts of true tripoli were added. The entire mass was then taken to dryness with stirring, thereafter ground lightly and then heated for 30 minutes at 540° C. The mass was slowly cooled and then stirred into 1000 parts of distilled water. The catalyst was separated by filtration and washed with 800 parts of aqueous 5.0% acetic acid. The catalyst was dried at 100° C. and was ready for use. The filtrate containing the acetic acid was examined spectrographically and found to be free of palladium. The catalyst itself was shown by a spectrographic analysis to contain less than 0.5 part per million of sodium.

The catalysts prepared by the processes of this invention may be used advantageously for the hydrogenation of many materials. For example, vegetable oils, unsaturated fatty acids, olefins, aromatic hydrocarbons, derivatives of the latter, etc., may be hydrogenated in accordance with this invention. Materials containing the abietyl radical, for example, rosin, abietic acid, esters thereof, such as, methyl abietate, ethyl abietate, glycerol abietate, glycol abietate, etc., abietyl alcohol, rosin oil, etc.; terpenes, such as, pine oil, alpha-terpineol, alpha-terpinene, dipentene, pinene, polymerized terpenes, etc.; cellulose ether peroxides, etc.; may be readily hydrogenated by the procedure described hereinabove using the noble metal catalysts of this invention. In general, these new catalysts may be used to hydrogenate any unsaturated organic compounds.

The method hereinbefore described relating to the preparation of noble metal oxide hydrogenation catalysts constitutes a substantial improvement in the art. It enables the production of this desirable type of catalyst without the loss of noble metal during the process of preparation. The catalysts produced by virtue of an application of this invention are of extremely high and uniform activity.

It will be understood that wherever the term "noble metal" is employed in this specification and claims attached, the metals of the currency group are not contemplated, but, on the contrary, the members of the group consisting of iridium, ruthenium, rhodium, platinum, osmium, and palladium are thereby contemplated.

It will be understood that the details and examples hereinbefore set forth are illustrative only and that the invention as broadly described and claimed is in no way limited thereby.

What I claim and desire to protect by Letters Patent is:

1. In the process for preparing a noble metal oxide hydrogenation catalyst by the fusion of a noble metal compound with an alkali metal nitrate, the step which comprises washing the reaction mass with an aqueous solution of an acid electrolyte, which solution is inert to and incapable of dissolving the noble metal oxide, and which electrolyte is free of elements which are potential producers of noble metal hydrogenation inhibitors.

2. In the process for preparing a noble metal oxide hydrogenation catalyst by the fusion of a noble metal compound with an alkali metal nitrate, the step which comprises washing the reaction mass with an aqueous solution of an organic acid electrolyte, which solution is inert to and incapable of dissolving the noble metal oxide, and which electrolyte is free of elements which are potential producers of noble metal hydrogenation inhibitors.

3. In the process for preparing a noble metal oxide hydrogenation catalyst by the fusion of a noble metal compound with an alkali metal nitrate, the step which comprises washing the reaction mass with an aqueous solution of an organic acid electrolyte, which solution is inert to and incapable of dissolving the noble metal oxide, which solution has a concentration of electrolyte greater than about 0.5% and which electrolyte is free of elements which are potential producers of noble metal hydrogenation inhibitors.

4. In the process for preparing a noble metal oxide hydrogenation catalyst by the fusion of a noble metal compound with an alkali metal nitrate, the step which comprises washing the reaction mass with an aqueous solution of an organic acid electrolyte, which solution is inert to and incapable of dissolving the noble metal oxide, which solution has a concentration of electrolyte within the range of from about 1% to about 10%, and which electrolyte is free of elements which are potential producers of noble metal hydrogenation inhibitors.

5. In the process for preparing a noble metal oxide hydrogenation catalyst by the fusion of a noble metal compound with an alkali metal nitrate, the step which comprises washing the reaction mass until substantially entirely free of alkali metal salts with an aqueous solution of an acid electrolyte, which solution is inert to and incapable of dissolving the noble metal oxide, and which electrolyte is free of elements which are potential producers of noble metal hydrogenation inhibitors.

6. In the process for preparing a noble metal oxide hydrogenation catalyst by the fusion of a noble metal compound with an alkali metal nitrate, the step which comprises washing the reaction mass with an aqueous solution of acetic acid.

7. In the process for preparing a platinum oxide hydrogenation catalyst by the fusion of a platinum compound with an alkali metal nitrate, the step which comprises washing the reaction mass with an aqueous solution of acetic acid.

8. In the process of preparing a palladium oxide hydrogenation catalyst by the fusion of a palladium compound with an alkali metal nitrate, the step which comprises washing the reaction mass with an aqueous solution of acetic acid.

9. In the process of preparing a rhodium oxide hydrogenation catalyst by the fusion of a rhodium compound with an alkali metal nitrate, the step which comprises washing the reaction mass with an aqueous solution of acetic acid.

10. In the process of preparing a supported platinum oxide hydrogenation catalyst by the fusion of a platinum compound with sodium nitrate, the step which comprises washing the reaction mass, containing supported platinum oxide, with an aqueous solution of acetic acid, which solution has an acetic acid concentration within the range of from about 1% to about 10%.

11. In the process for preparing a supported palladium oxide hydrogenation catalyst by the fusion of a palladium compound with sodium nitrate, the step which comprises washing the reaction mass, containing supported palladium oxide, with an aqueous solution of acetic acid, which solution has an acetic acid concentration within the range of from about 1% to about 10%.

12. In the process for preparing a supported rhodium oxide hydrogenation catalyst by the fusion of a rhodium compound with sodium nitrate, the step which comprises washing the reaction mass, containing supported rhodium oxide, with an aqueous solution of acetic acid, which solution has an acetic acid concentration within the range of from about 1% to about 10%.

WILLIAM J. KIRKPATRICK.